(12) United States Patent
Bradler et al.

(10) Patent No.: US 11,454,862 B2
(45) Date of Patent: Sep. 27, 2022

(54) APPARATUS AND METHODS FOR SPATIO-TEMPORAL IMPLEMENTATION OF ARBITRARY UNITARY TRANSFORMATIONS ON OPTICAL MODES

(71) Applicant: Xanadu Quantum Technologies Inc., Toronto (CA)

(72) Inventors: Kamil Bradler, Toronto (CA); Daiqin Su, Toronto (CA); Zachary Vernon, Toronto (CA); Lukas Helt, Toronto (CA); Ish Dhand, Toronto (CA)

(73) Assignee: Xanadu Quantum Technologies Inc., Toronto (CA)

( * ) Notice: Subject to any disclaimer, the term of this patent is extended or adjusted under 35 U.S.C. 154(b) by 476 days.

(21) Appl. No.: 16/719,028

(22) Filed: Dec. 18, 2019

(65) Prior Publication Data

US 2021/0191232 A1  Jun. 24, 2021

(51) Int. Cl.
*G06E 3/00* (2006.01)
*G02B 6/293* (2006.01)
*G02B 6/12* (2006.01)
*G02F 3/00* (2006.01)
*G06N 10/00* (2022.01)

(52) U.S. Cl.
CPC ........... *G02F 3/00* (2013.01); *G02B 6/12004* (2013.01); *G02B 6/2935* (2013.01); *G06E 3/008* (2013.01); *G06N 10/00* (2019.01)

(58) Field of Classification Search
None
See application file for complete search history.

(56) References Cited

U.S. PATENT DOCUMENTS

| 10,641,954 | B2 | 5/2020 | Clements et al. | |
|---|---|---|---|---|
| 10,763,974 | B2* | 9/2020 | Bunandar | H04J 14/04 |
| 2017/0351293 | A1* | 12/2017 | Carolan | G06E 3/006 |
| 2019/0086610 | A1 | 3/2019 | Clements et al. | |
| 2021/0096443 | A1* | 4/2021 | Dhand | G06N 10/00 |
| 2021/0097421 | A1* | 4/2021 | Dhand | G06F 17/11 |
| 2021/0191232 | A1* | 6/2021 | Bradler | G02F 3/00 |

* cited by examiner

*Primary Examiner* — Rhonda S Peace
(74) *Attorney, Agent, or Firm* — Cooley LLP

(57) ABSTRACT

An apparatus includes a plurality of interconnected reconfigurable beam splitters and a plurality of phase shifters collectively configured to define a network of optical devices. The network of optical devices is configured to perform a universal transformation on a plurality of input optical signals via a triangular architecture. The apparatus also includes a first delay line optically coupled to the network of optical devices and configured to send at least one output optical signal from a plurality of output optical signals of the network of optical devices to interact with at least one input optical signal in the plurality of input optical signals within the network of optical devices.

18 Claims, 9 Drawing Sheets

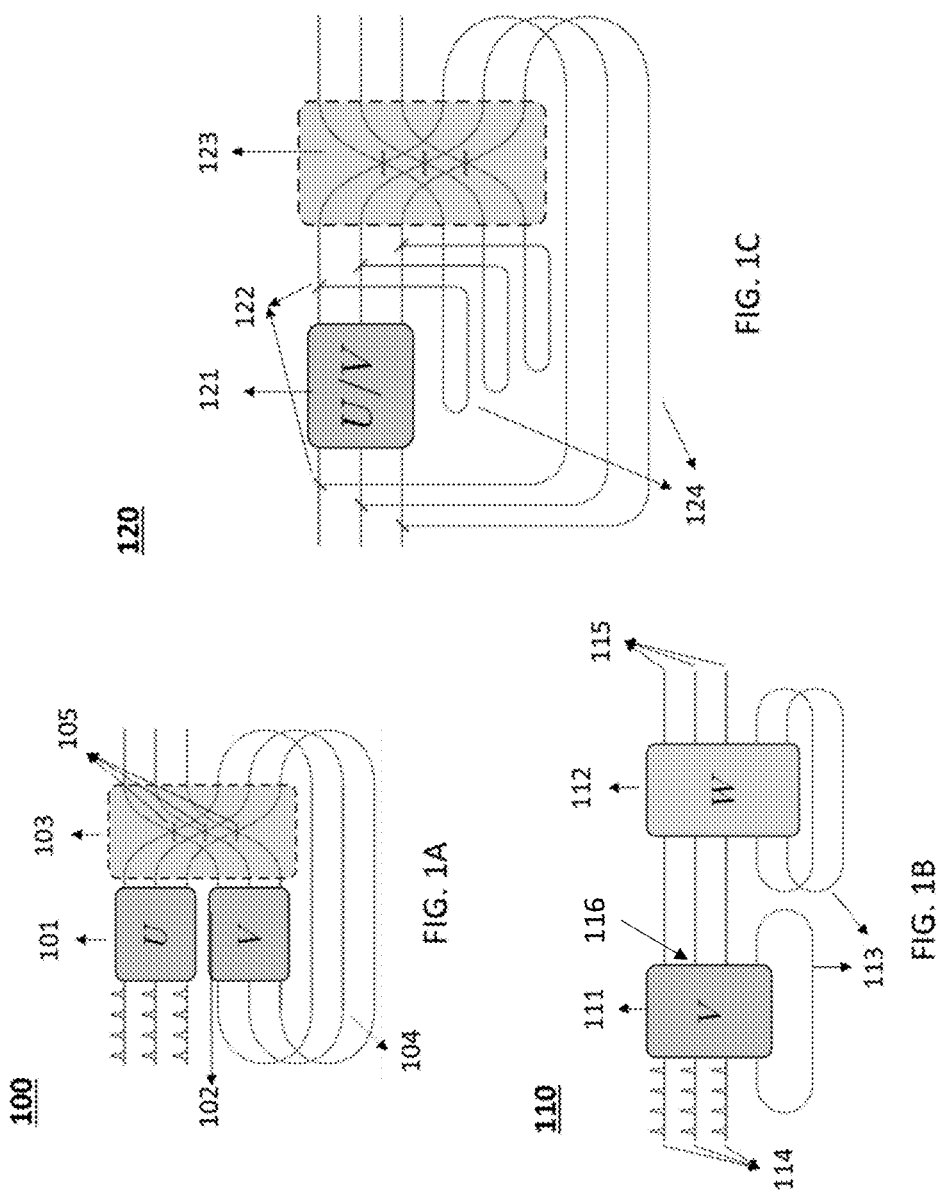

… (1)

APPARATUS AND METHODS FOR SPATIO-TEMPORAL IMPLEMENTATION OF ARBITRARY UNITARY TRANSFORMATIONS ON OPTICAL MODES

TECHNICAL FIELD

The disclosure relates in general to spatio-temporal implementation of arbitrary unitary transformations on optical modes.

BACKGROUND

It is predicted that quantum computers will dramatically outperform their conventional counterparts. Such supremacy, however, has not been shown yet. Linear optical interferometers are used, for example, in quantum information technologies including, for example, quantum computing, quantum metrology, vibronic spectroscopy, boson sampling, Gaussian boson sampling, universal quantum computation, and quantum neural networks. Recent advances in integrated photonics, photon generation, and photon detection have enabled relatively low resource devices for boson sampling, a rudimentary quantum algorithm tailored to the platform of linear optics. It is expected that boson sampling will demonstrate quantum supremacy in the relatively near term. Obtaining quantum supremacy in boson-sampling applications involves scaling up the linear optical interferometers to a large number of optical modes.

Implementing a programmable linear optical interferometer on thousands of modes, however, is typically not feasible using bulk free-space optical components because of stability constraints. Moreover, implementing spatially-encoded universal multi-port interferometers on integrated photonic platforms with relatively high controllability becomes increasingly difficult as the number of modes increases.

Thus, a need exists for the use of the temporal degree of freedom as an alternative or in addition to the spatial optical modes.

SUMMARY

Some embodiments described herein relate generally to spatio-temporal implementation of arbitrary unitary transformations, and, in particular, to implementing large N-mode unitary transformations via a combination of smaller M-mode optical circuits via a triangular architecture. In some embodiments, an apparatus includes a plurality of interconnected reconfigurable beam splitters and a plurality of phase shifters collectively configured to define a network of optical devices. The network of optical devices is configured to perform a universal transformation on a plurality of input optical signals via a triangular architecture. The apparatus also includes a first delay line optically coupled to the network of optical devices and configured to send at least one output optical signal from a plurality of output optical signals of the network of optical devices to interact with at least one input optical signal in the plurality of input optical signals within the network of optical devices.

In some embodiments, an apparatus includes a plurality of optical units optically connected in series. Each optical unit from the plurality of optical units has a reconfigurable Mach-Zehnder interferometer (MZI) that includes at least one phase shifter optically coupled to the at least one reconfigurable MZI. Each optical unit from the plurality of optical units is configured to receive an input optical signal and configured to send an output optical signal that is temporally delayed relative to the input optical signal for that optical unit and that is recirculated with the input optical signal for that optical unit.

BRIEF DESCRIPTION OF THE DRAWINGS

The drawings are not strictly to scale; various aspects of the subject matter are shown enlarged in the drawing to facilitate an understanding of the concept.

FIG. 1A shows a schematic of an apparatus for spatio-temporal implementation of cosine-sine (CS) decomposition, according to an embodiment.

FIG. 1B shows a schematic of an apparatus for hybrid spatio-temporal implementation of elimination-based decomposition, according to an embodiment.

FIG. 1C shows a schematic of an apparatus for hybrid spatio-temporal implementation of CS decomposition, according to an embodiment.

DETAILED DESCRIPTION

Figure 1D:
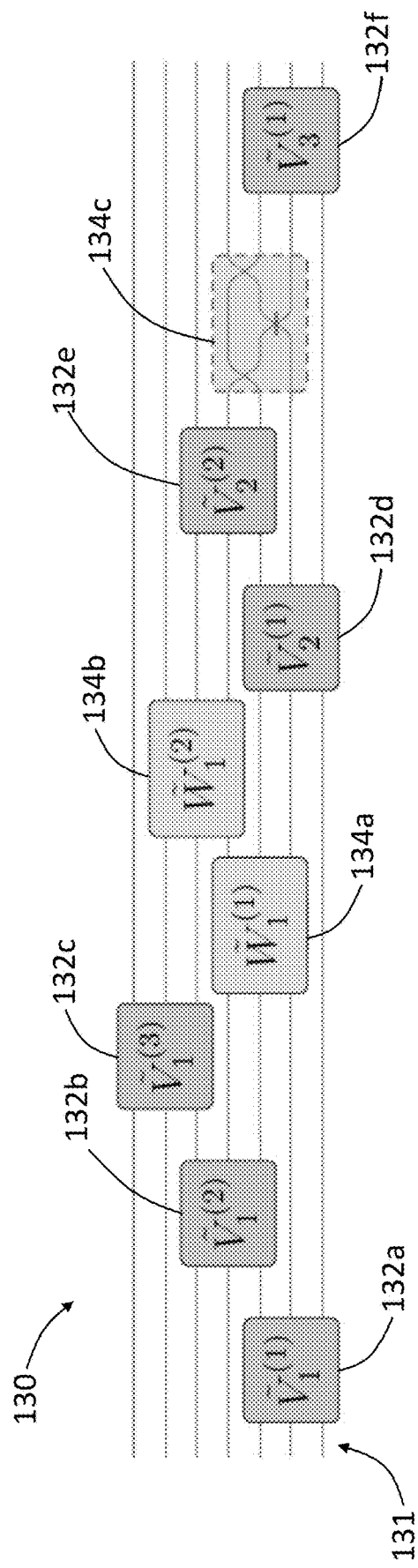
FIG. 1D is a diagram illustrating elimination-based decomposition of an arbitrary unitary matrix $U_7$ via a triangular architecture, according to an embodiment.

In one example, a method is described herein by which a hybrid spatio-temporal mode encoding system can be constructed using an arrangement of multiple optical delay lines and multiple tunable beam splitters on a photonic integrated circuit platform(s). The photonic integrated circuit platform can be fabricated in a variety of photonic materials and material combinations including, for example, silicon on insulator, silicon nitride, aluminum nitride, lithium niobate, and III-V semiconductors. The hybrid spatio-temporal system can simultaneously exploit spatial and temporal degrees of freedom of light to effect arbitrary discrete unitary transformations. The hybrid spatio-temporal system can combine the benefits of spatial implementations of linear optics, namely low loss and parallel operation, with those of temporal implementations, namely the use of modest resources and the access to arbitrarily large transformation dimensions.

Quantum logic gates are typically represented by unitary matrices; in the case of logic gates with two quantum modes, the unitary matrices are of dimension 4×4. A large class of unitary transformations can be implemented by sending photons through an optical system including beam splitters and phase shifters. For example, an N-mode linear optical interferometer is characterized by a unitary operator U(N). In some instances, the global phase of the emitted light can be inconsequential, and the unitary operator U(N) can be assumed to be in the group of special unitary matrices SU(N). The hybrid spatio-temporal system described herein can be configured to implement at least two types of decompositions, which factorize special unitary group of degree N, or SU (N) transformations, into products of unitary group of degree M, or U(M) transformations, to effect arbitrary N×N discrete unitary transformations on the temporal modes of light in M spatial modes. These spatial modes are acted upon by the obtained U(M) transformations at different times, with optical delay lines connecting different temporal modes together within these spatial modes.

FIGS. 1A-1C show schematics of apparatus for spatio-temporal implementation of unitary transformations on input optical modes (also referred to as input optical signals), according to embodiments. In general, each apparatus includes a plurality of interconnected reconfigurable beam splitters and a plurality of phase shifters collectively configured to define a network of optical devices (e.g., interferometers). The network of optical devices is configured to perform a universal transformation on a plurality of input optical signals via a triangular architecture. Each apparatus also includes a first delay line (e.g., 104, 113, or 124, discussed with more details below) optically coupled to the network of optical devices and configured to send at least one output optical signal from a plurality of output optical signals of the network of optical devices to interact with at least one input optical signal in the plurality of input optical signals within the network of optical devices.

FIG. 1A shows a schematic of an apparatus 100 for spatio-temporal implementation of cosine-sine (CS) decomposition, according to an embodiment. In some instances, the apparatus 100 can be configured to implement one layer of elementary matrices on N/M temporal pulses in M spatial modes for M=3 using two universal interferometers (labeled as "U" 101 and "V" 102) and one non-universal interferometer 103 (also referred to as a CS interferometer 103) comprising M beamsplitters 105.

FIG. 1B shows a schematic of an apparatus 110 for hybrid spatio-temporal implementation of elimination-based decomposition, according to an embodiment. In some instances, the apparatus 110 can be configured to decompose an N×N unitary matrix into elementary interferometers comprising a M-mode universal interferometer 111 (labelled as "V") and a (2M−3)-mode specialized interferometer 112 (labeled as "W", also referred to as a residual interferometer) for M=4. The delay lines at the bottom of FIGS. 1A 104 and 1B 113 effect a time delay equal to pulse separation τ. The universal interferometer 111 includes M input ports 114 and M output ports 116. The residual interferometer 112 includes 2M−3 output ports 115.

FIG. 1C shows a schematic of an apparatus 120 for hybrid spatio-temporal implementation of CS decomposition, according to an embodiment. The apparatus 120 is configured to implement both U and V interferometers using a single physical interferometer 121 that is optically coupled with a CS interferometer 123. The horizontal lines 105 within CS interferometer 123 represent tunable beamsplitters and the diagonal lines 122 outside CS interferometer 123 represent switches. The two kinds of delays 124 correspond to τ/2 time delays before and after the interferometers.

In the apparatus 100, the CS interferometer 103 includes two groups of input ports. The first group of input ports is optically coupled to the output ports of the universal interferometer 101 and the second group of input ports is optically coupled to the output ports of the universal interferometer 102. Each beamsplitter in the beamsplitters 105 is configured to receive two inputs: a first input from an output port of the universal interferometer 101 and a second input from the universal interferometer 102. The CS interferometer 103 also includes two groups of output ports. The first group of output ports is configured to send the output to the next stage of processing and the second group of output ports is configured to send the output back to the universal interferometer 102 via the delay lines 104.

The CS interferometer 123 also includes two groups of input ports. The first input ports is optically coupled to the output ports of the universal interferometer 121 when the switches 122 are in the transmissive state. The second group of input ports is optically coupled to the output ports of the universal interferometer 121 when the switches 122 are in the reflective state. Each beamsplitter in the CS interferometer 123 is configured to receive two inputs: a first input from one output port of the universal interferometer 121 by configuring the switches 122 in the transmissive state and a second input from the same output port of the universal interferometer 121 by configuring the switches 122 in the reflective state. The delay lines between the switches 122 and the input ports of the CS interferometer 123 can be configured to introduce a time delay substantially equal to the time delay between adjacent optical modes in the input optical modes of the apparatus 120. Therefore, adjacent batches of output optical modes from the universal interferometer 121 can interact in the CS interferometer 123. More details about the universal interferometers (e.g., 101, 102, 111, and 121) and residual interferometer 112 can be found below with reference to FIGS. 5A-5D.

Before describing more details of the structure and operation of the apparatus 100, 110, and 120, it can be useful to describe the two types of decompositions that can be implemented by these apparatuses. The first type of decomposition is referred to as the elimination-based decomposition and the second type of decomposition is referred to as the cosine-sine (CS) decomposition. Each type of decomposition and the corresponding implementation is described below.

The elimination-based decomposition procedure can decompose a given SU(N) matrix into two types of elementary matrices and specialized residual unitary matrices. The elimination decomposition is obtained by eliminating elements from the given unitary matrix. For the purpose of elimination, the N×N unitary matrix $T_{mn}(\theta, \phi)$ can be defined with n>m. The $T_{mn}(\theta,\phi)$ can be obtained from the N×N identity matrix by changing the entries at the intersection of the m-th row and n-th column to:

$$\begin{pmatrix} \cos\theta\ e^{-i\phi} & -\sin\theta \\ \sin\theta\ e^{-i\phi} & \cos\theta \end{pmatrix} \quad (1)$$

and leaving the other entries unchanged. The elimination-based decomposition procedure uses the following property of the $T_{mn}(\theta, \phi)$ matrix. For a given matrix U, with suitably chosen values of θ and ϕ, $T_{mn}(\theta, \phi)$ can be multiplied into U from the left to obtain a resultant matrix where the target (row m and column n) element is now zero. Physically, each $T_{mn}(\theta, \phi)$ can be realized using a beam splitter and phase shifters parameterized by $\theta$ and $\phi$ acting on modes labeled by m and n.

To illustrate the elimination-based decomposition, the following description uses, as an example, a general SU(7) matrix $U_7$ that is decomposed into U(3) matrices. The method described herein can be extended to other unitary matrices as well. Without loss of generality, the matrix $U_7$ can be written as:

$$\begin{pmatrix} * & C^8_{(1,2)} & C^7_{(2,3)} & B^5_{(3,4)} & B^4_{(4,5)} & A^2_{(5,6)} & A^1_{(6,7)} \\ & * & C^9_{(2,3)} & E^{11}_{(2,4)} & B^6_{(4,5)} & D^{10}_{(4,6)} & A^3_{(6,7)} \\ & & * & G^{16}_{(3,4)} & G^{15}_{(4,5)} & F^{13}_{(5,6)} & F^{12}_{(6,7)} \\ & & & * & G^{17}_{(4,5)} & H^{18}_{(4,6)} & F^{14}_{(6,7)} \\ & & & & * & I^{20}_{(5,6)} & I^{19}_{(6,7)} \\ & & & & & * & I^{21}_{(6,7)} \\ & & & & & & * \end{pmatrix} \quad (2)$$

In Equation (2), the bottom off-diagonal part is not explicitly shown for simplicity due to the fact that $U^H = U^{-1}$. In addition, the elements of $U_7$ are complex valued in general and they are divided into nine groups labelled by capital letters (i.e., groups A to I). The subscripts (m, n) associated with each matrix element above the diagonal represent the matrix Tim that is used to null this element. The superscript (i.e., 1 to 21) for each matrix element indicates the order of nulling.

The elimination-based decomposition of the matrix $U_7$ can start with the followings steps to null elements in groups A through E (i.e., elements in the first two rows). First, the matrix $U_7$ is multiplied by $(T_{67}T_{56}T_{67})^{-1}$ to generate $U^{(1)}$. This multiplication nulls three elements in group A. To null elements in group B, the matrix $U^{(1)}$ is multiplied by $(T_{45}T_{34}T_{45})^{-1}$ to generate $U^{(2)}$. Then the matrix $U^{(2)}$ is multiplied by $(T_{23}T_{12}T_{23})^{-1}$ to null the three elements in group C, resulting in a matrix $U^{(3)}$. The elements in group D are nulled by multiplying the matrix $U^{(3)}$ with $T_{46}^{-1}$ and the resulting matrix is denoted as $U^{(4)}$, which is then multiplied with $T_{24}^{-1}$ to generate $U^{(5)}$ and null elements in group E.

In the above steps, the parameters of each $T_{mn}$ above are chosen to null a specific matrix element and are, in general, not the same even if they have the same subscripts m and n. The above steps to null elements in groups A to E form the first round of the elimination-based decomposition, after which all entries in the first two rows of the top off-diagonal part are zero.

The elimination-based decomposition can continue to null the remaining elements in the given matrix $U_7$, which can be written as:

$$U_7(T_{67}T_{56}T_{67})^{-1}(T_{45}T_{34}T_{45})^{-1}(T_{23}T_{12}T_{23})^{-1}T_{46}^{-1} \\ T_{24}^{-1}(T_{67}T_{56}T_{67})^{-1} \ldots (T_{45}T_{34}T_{45})^{-1}T_{46}^{-1} \\ (T_{67}T_{56}T_{67})^{-1} = D \quad (3)$$

where D is a diagonal matrix $D = \text{diag}(e^{i\delta_1}, e^{i\delta_2}, \ldots, e^{i\delta_7})$. In Equation (3), all the $T_{mn}$ matrices are multiplied with the $U_7$ matrix from its right side. In addition, the $T_{mn}$ matrices in each bracket can be combined to form a three-mode unitary matrix, i.e., a U(3) matrix, denoted by $\tilde{V}$. The matrices $\tilde{V}$ act on three adjacent rows in the matrix $U_7$ and leave the other rows unchanged.

FIG. 1D is a diagram 130 illustrating elimination-based decomposition of an arbitrary unitary matrix $U_7$ via a triangular architecture, according to an embodiment. The diagram 130 includes seven input ports 131 (e.g., waveguides) to receive seven input optical modes for unitary transformations via nine smaller interferometers (i.e., interferometers acting on less than seven modes). More specifically, these nine interferometers include six universal interferometers 132a to 132f (collectively referred to as universal interferometers 132) and three residual interferometers 134a to 134c (collectively referred to as residual interferometers 134). The subscript (i.e., 1 to 3) associated with each universal interferometer 132 and residual interferometer 134 indicates the layer of implementation. For example, universal interferometers 132a to 132c and residual interferometers 134a and 134b form the first layer. The universal interferometers 132 are configured to implement three-mode universal transformations characterized by $\tilde{V}$ (i.e., combined transformation in each bracket in Equation (3)). The residual interferometers 134 are configured to implement residual transformations characterized by $\tilde{W}$ (more details are provided below).

In Equation (3), the remaining unitary matrices $T_{46}$ and $T_{24}$ represent single beam-splitter transformations. These transformations do not involve any coupling between adjacent modes. Therefore, $T_{46}$ can be implemented by: (1) swapping modes with indices 4 and 5 (e.g., using swap gates described herein), which allows mode 4 to be coupled to mode 6; and (2) swapping modes 4 and 5 back to their original order after the interaction. Similar swaps are used for implementing the single beam splitter $T_{24}$. The swap operation can be viewed as a beam splitter with unit transmissivity (i.e., fully transmissive). Two swaps and a single beam splitter can be combined to form a three-mode unitary, which is referred to as a residual unitary, denoted by $\tilde{W}$ as illustrated in FIG. 1D. This three-mode residual unitary is not universal because only one beam splitter is tunable and the other two can have fixed setting (e.g., fully transmissive). Altogether, the $U_7$ matrix can be decomposed into six $U_3$ matrices $\tilde{V}$, three residual matrices $\tilde{W}$, and seven phases corresponding to the diagonal matrix D. As U is a special unitary matrix, one of these phases can be set equal to unity so only six additional phase shifters are used.

In some instances, the diagram 130 also represents the optical circuit that implements the decomposition in Equation (3). In these instances, each universal interferometer 132 and residual interferometer 134 represents a corresponding hardware unit (see, e.g., FIGS. 5A-5D). In some instances, the decomposition in the diagram 130 can be implemented by apparatus 100-120 shown in FIG. 1A-1C as described with more details below.

The elimination-based decomposition described above can be generalized to decompose an arbitrary SU(N) matrix for general M (i.e., decomposing an N-mode unitary transformation into a plurality of M-mode transformations). The first step is to null the top M−1 rows using standard and residual matrices. In this step, a total number of k standard $U_M$ matrices are used to null the k triangular units of M−1 rows and columns each, where k=(N−1)/(M−1). These units are similar to the two-row two-column units A, B, and C in Equation (2). The remaining elements are nulled using the residual unitary $\tilde{W}$, the determination of which is described below. After this, the remaining matrix is diagonal in the top M−1 rows and unitary in the remaining rows and columns. The next M−1 rows are nulled in the next step. The procedure is completed after k such steps, with each nulling M−1 rows. Therefore, any given $U_N$ can be decomposed into k(k+1)/2 universal M-mode matrices and k(k−1)/2 residual matrices with size (2M−3)×(2M−3).

The determination of general residual matrices can be illustrated by an example of decomposing a U(13) unitary matrix into U(5) unitary matrices. After the application of the U(5) unitary matrices, a top-right submatrix of an SU(13) matrix is in the form:

$$\begin{pmatrix} 0 & 0 & 0 & 0 & 0 & 0 & 0 & 0 \\ S^7_{(2,6)} & 0 & 0 & 0 & R^1_{(6,10)} & 0 & 0 & 0 \\ S^9_{(3,6)} & S^8_{(6,7)} & 0 & 0 & R^3_{(7,10)} & R^2_{(10,11)} & 0 & 0 \\ S^{12}_{(4,6)} & S^{11}_{(6,7)} & S^{10}_{(7,8)} & 0 & R^6_{(8,10)} & R^5_{(10,11)} & R^4_{(11,12)} & 0 \end{pmatrix} \quad (4)$$

A single residual unitary leads to the elimination of six nonzero entries $R^1_{(6,10)}$, $R^2_{(10,11)}$, $R^3_{(7,10)}$, $R^4_{(11,12)}$, $R^5_{(10,11)}$, and $R^6_{(8,10)}$, where the superscripts represent the order of elimination. This elimination can be performed by sequentially applying $T^{-1}_{6,10}$, $T^{-1}_{10,11}$, $T^{-1}_{7,10}$, $T^{-1}_{11,12}$, $T^{-1}_{10,11}$, and $T^{-1}_{8,10}$. These six beam-splitter transformations are combined together to form the specialized non-universal unitary $\tilde{W}$.

Similar to above, $T^{-1}_{6,10}$, $T^{-1}_{7,10}$, and $T^{-1}_{8,10}$ involve nonadjacent interactions. Therefore, to physically implement $T^{-1}_{6,10}$, the sixth port is shifted to the ninth port, which involves three swaps. To physically implement $T^{-1}_{7,10}$, three swaps are also involved since the seventh port has been shifted to the sixth port when implementing $T^{-1}_{6,10}$. The same number of swaps is also used to implement $T^{-1}_{8,10}$. After all entries are eliminated, another three swaps can be used to arrange all modes back to the original order. Therefore, the total number of swaps is 4×3=12. The above procedure to construct a residual unitary can be generalized to an arbitrary integer M leading to a decomposition that uses (M−1)(M−2)/2 beam splitters and (M−1)(M−2) swaps.

The cosine-sine based decomposition (CSD) procedure can factorize any arbitrary (m+n)×(m+n) unitary matrix $U_{m+n}$ into unitary matrices $\tilde{L}_{m+n}$, $\tilde{S}_{m+n}$, and $\tilde{R}_{m+n}$ according to:

$$U_{m+n} = \tilde{L}_{m+n}(\tilde{S}_{2m} \oplus I_{n-m})\tilde{R}_{m+n},$$

$$\tilde{L}_{m+n} = \begin{pmatrix} L_m & 0 \\ 0 & L'_n \end{pmatrix}, \quad \tilde{R}_{m+n} = \begin{pmatrix} R^\dagger_m & 0 \\ 0 & R'^\dagger_n \end{pmatrix}$$

where $I_{n-m}$ is an identity matrix and $\tilde{S}_{2m}$ is a cosine-sine (CS) matrix of the form $$\begin{pmatrix} \text{diag}(\cos\theta_1, \ldots, \cos\theta_m) & \text{diag}(\sin\theta_1, \ldots, \sin\theta_m) \\ -\text{diag}(\sin\theta_1, \ldots, \sin\theta_m) & \text{diag}(\cos\theta_1, \ldots, \cos\theta_m) \end{pmatrix}$$

The matrix subscripts give the dimensions of the matrices. The matrices $L_m$, $L_n'$, $R_m$, $R'_n$ and all angles denoted by $\theta$ can be determined using stable numerical methods, for example, using LAPACK (Linear Algebra Package) as a standard software library for numerical linear algebra. The CSD method can be applied repeatedly to decompose an N×N unitary into smaller matrices, for example, M×M universal unitary and specialized M×M CS matrices, which are collectively referred to as elementary matrices.

Figure 1E:
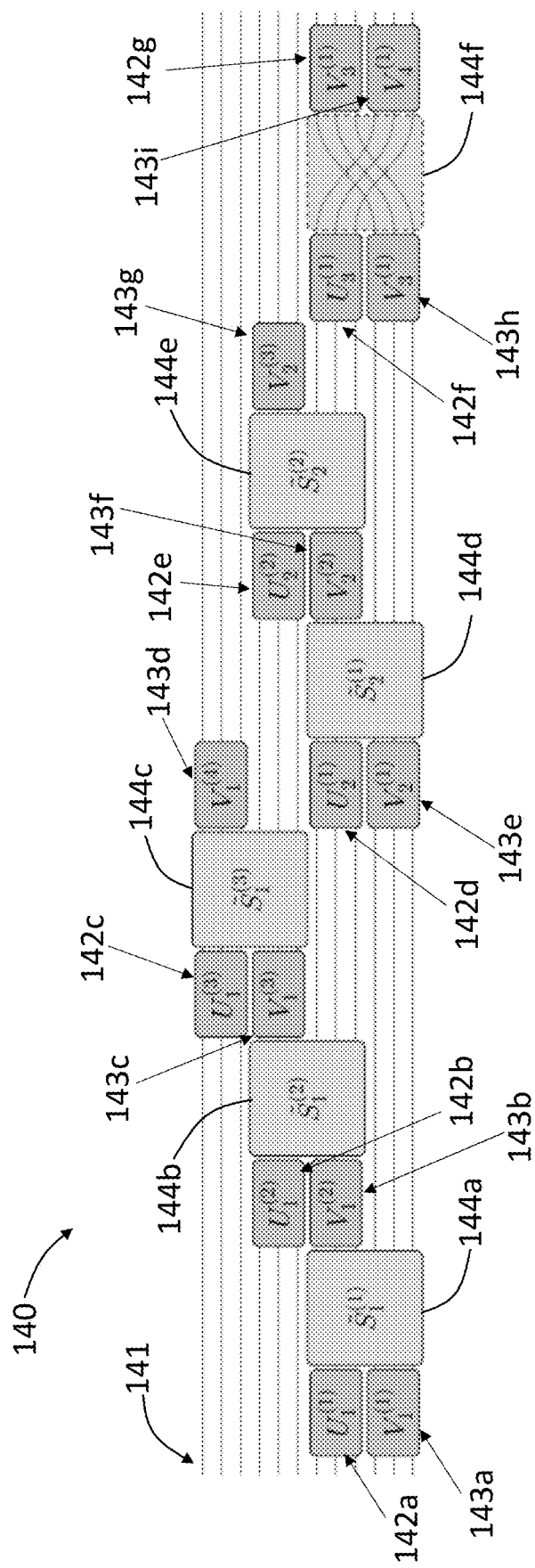
FIG. 1E is a diagram illustrating CS decomposition of 12-mode unitary matrix $U_{12}$, according to an embodiment, according to an embodiment.

FIG. 1E is a diagram 140 illustrating CS decomposition of 12-mode unitary matrix $U_{12}$, according to an embodiment, according to an embodiment. The diagram 140 includes twelve input ports to receive twelve input optical modes that are processed by six CS interferometers 144a to 144f (collectively referred to as CS interferometers 144). Each CS interferometer from the six CS interferometers 144 is optically coupled to two universal interferometers (labelled as U and V, respectively). The diagram 140 includes universal interferometers 142a to 142g and universal interferometers 143a to 143i. The subscript (i.e., 1 to 4) associated with each interferometer indicates the layer of implementation.

Without loss of generality, taking N=lM for an integer l, the decomposition of an arbitrary unitary matrix $U_N$ can turn into an iterative process with l−1 iterations. In the first iteration, the full N×N matrix is decomposed via l−1 applications of the CSD into a single (N−1)-dimensional unitary matrix along with a "layer" of elementary matrices comprising 2l−1 M×M unitary matrices (labelled as $U_i^{(j)}$, $V_i^{(j)}$ in FIG. 1E) and l−1 CS matrices (labelled as $\tilde{S}_i^{(j)}$ in FIG. 1E). In general, the (i+1)th iteration uses the CSD to decompose the (N−i×l)-dimensional unitary matrix into a layer of elementary matrices and a smaller (N−(i+1)×l)-dimensional unitary matrix, which is then decomposed in subsequent iterations. Eventually, the full unitary is decomposed into l layers of elementary matrices, of which the last layer comprises a single M×M universal unitary matrix.

Now turning to the implementation of elimination-based and CS decompositions, as described herein, the elimination-based decomposition returns k=(N−1)/(M−1) layers of M-mode universal matrices $\hat{V}$ and k−1 layers of (2M−3)-mode residual unitary matrices $\tilde{W}$. Different layers are labeled by different subscripts in FIG. 1D. To implement elimination-based decomposition using the spatio-temporal hybrid architecture, the bottom M−1 rows of the $\tilde{V}$ and $\tilde{W}$ matrices can be shifted to the top, and the resultant matrices are denoted as V and W. One way to implement the resulting V and W matrices involves (M−1)² additional swap gates as compared to implementing $\tilde{V}$ and $\tilde{W}$. Specifically, changing $\tilde{V}$ to V straightforwardly uses (M−1) additional swaps. These swap gates, however, can be combined with $\tilde{V}$ to form another universal interferometer V so no additional swaps are actually used. From the residual unitary $\tilde{W}$ to W, the bottom (M−1) rows are swapped with the top (M−1) rows. Implementing this straightforwardly uses (M−1)(M−2) swaps. But some of the swaps cancel with each other and the total number of swaps in W is reduced. In particular, at least 2M−3 swaps can be canceled or absorbed into the beam splitters.

To implement the elimination based decomposition, the interferometer 111 includes a tunable M-mode universal spatial interferometer that can have M−1 input ports 114 and output ports 116. One input port 114 is connected to one output port 116 with an optical delay line 113 having a length to introduce a delay equal to the separation i between subsequent temporal modes. Implementation of V 111 can involve M(M−1)/2 beamsplitters. In addition, a residual matrix W 112 can be provided that can comprise a 2M−3 dimensional spatial mode interferometer and M−2 optical delay lines (only two are shown in FIG. 1B for illustrative purposes). Thus, the representative residual matrix W 112 can be implemented using (M−1)(M−2)/2 beam splitters. Using this configuration, the number of optical elements can be reduced.

The sequence of operations for effecting a single layer of V matrices is as follows. Initially, a single temporal mode (pulse) impinges on V at the first input port and the V interferometer is set such that the pulse moves into the optical delay line. When this pulse is guided to the M-th input of V, another M−1 pulses impinge simultaneously via the first M−1 input ports of V. Then the first M-mode unitary $V_1^{(1)}$ is implemented. After this action, the first M−1 output pulses from V move on to the next layer while the last output pulse moves into the delay loop and will couple with another M−1 pulses that arrive after an interval τ on unitary $V_1^{(2)}$. This process continues until all $V_1^{(j)}$ unitary cells in the first layer are implemented. A similar sequence of operations effects the $W_1$ layer. The full N×N unitary matrix is a composition of the action of k physical layers of V matrices and k−1 layers of W matrices. Multiple layers of unitary matrices can be implemented either by using these two interferometers in a more traditional dual-loop configuration or the chain-loop configuration described hereafter.

In the dual-loop architecture, only a single block (as in FIG. 1A) of two interferometers is used. Also, a total of M−1 optical delay lines are used to feed the light emitted from the block back into the input of the block. These delay lines, which implement time delays≥kτ, are attached to the output ports via switches that can guide some of the pulses into the delay lines while other pulses are transmitted onwards. Each action of the two interferometers effects a single layer. Thus, implementing a total of k layers results in k passes of the pulses through the V and W interferometers and k−1 passes through the delay lines.

The CS-based architecture effects SU(N) transformations on M spatial and l=N/M temporal modes of light. The scheme employs tunable universal interferometers, each acting on M spatial modes and non-universal 2M-mode interferometers, each using only M beam splitters. A single layer of unitary blocks can be implemented on spatial and temporal modes using three optical elements (e.g., illustrated in FIG. 1B). The matrices U and V are universal tunable interferometers.

The sequence of operations for this architecture is as follows. The first M pulses, one in each of the M spatial modes, arrive simultaneously at U (e.g. 101 in FIG. 1A). On the first set of pulses, U implements an identity transformation, leaving these pulses to pass unchanged. Also only for the first set of pulses, the CS interferometer (e.g., 103) redirects the pulses into the M delay lines by tuning all the beamsplitters to unit transmissivity T=sin π/2=1. Because of the delay lines, the next M pulses arrive at U at the same time that these cycling pulses arrive at V (e.g., 102 in FIG. 1A). Now these two interferometers enact the first two unitary transformations of the decomposition procedure, i.e., the blocks $U_1^{(1)}$ and $V_1^{(1)}$ in FIG. 1E.

Together, these 2M pulses are acted upon by the CS interferometer. M pulses of these 2M pulses leave the CS interferometer and another M pulses enter the delay lines to arrive at the interferometers (e.g., U/V) synchronously with the next set of M pulses. In the next round, the two universal and one CS interferometers are tuned to their next settings, i.e., the setting configured to implement transformations labelled with next superscripts in FIG. 1E. This process is repeated for l−1 times, until the complete first layer is implemented. As in the case of the elimination-based decomposition, the full unitary is implemented by concatenating multiple layers. This can be realized by chaining together a sequence of l spatial interferometers one after the other, or using an appropriate dual-loop architecture.

The number of optical elements involved to implement a single layer of elementary matrices can be further reduced. For example, the two universal interferometers used in the apparatus 100 for CS-based decomposition and the apparatus 110 for elimination-based decomposition can be implemented by a single interferometer 121 with additional switches 122. The hybrid spatio-temporal system 120 (shown in FIG. 1C) presents a system arrangement for implementing an SU(N) matrix on the combined temporal and spatial modes of light. In such a hybrid configuration, the action of one layer of interferometers on spatial modes of light can be replaced by the action of a single tunable interferometer with suitable optical delay lines on the spatial and temporal modes of light. In FIG. 1C, a single physical tunable interferometer 121 plays the role of both $U_M$ and $V_M$ by switching between these two operating states after time τ/2. Two sets of M optical delay lines 124 implementing time delays of τ/2 are used: one from the universal interferometer 121 to the CS interferometer 123 and another from the CS 123 to the universal interferometer 121.

In some embodiments, the methods described herein (e.g., operations of the apparatus 100-120) can be performed by one or more controllers (not shown in FIGS. 1A-1C). The controller can include any suitable processing device configured to run or execute a set of instructions or code (e.g., stored in the memory) such as a general-purpose processor (GPP), a field programmable gate array (FPGA), a central processing unit (CPU), an accelerated processing unit (APU), a graphics processor unit (GPU), an Application Specific Integrated Circuit (ASIC), and/or the like. Such a processor can run or execute a set of instructions or code stored in the memory associated with using a PC application, a mobile application, an internet web browser, a cellular and/or wireless communication (via a network), and/or the like.

In some embodiments, for both elimination-based and CS decompositions, M can be anywhere between 3 and 100 (e.g., about 3, about 5, about 10, about 20, about 30, about 50, or about 100, including any values and sub ranges in between). In addition, N can be about 7 to about 10,000 (e.g., about 7, about 10, about 20, about 30, about 50, about 100, about 500, about 1000, about 2000, about 5000, or about 10000, including any values and sub ranges in between).

In another example, a method is described herein by which a temporal mode encoding system can be constructed using multiple optical delay lines and tunable beam splitters on a photonic integrated circuit platform. As used herein, encoding of input optical modes (also referred to as input optical signals) includes the process of performing a transformation, characterized by a matrix, on the input optical modes. Therefore, the transformation uses the unitary matrix to transform the information within the input optical modes into a set of output optical modes, which can represent the same information encoded in a different basis.

Two possible arrangements can be used to make use of temporal mode encoding (also referred to as time-bin encoding) to implement a multiport interferometer. The multiple optical delay lines and tunable beam splitters perform at least one linear transformation on multiple optical modes. The photonic integrated circuit device can be fabricated in a variety of photonic material platforms, for example, silicon on insulator, silicon nitride, aluminum nitride, lithium niobate, and III-V photonics.

Figure 2:
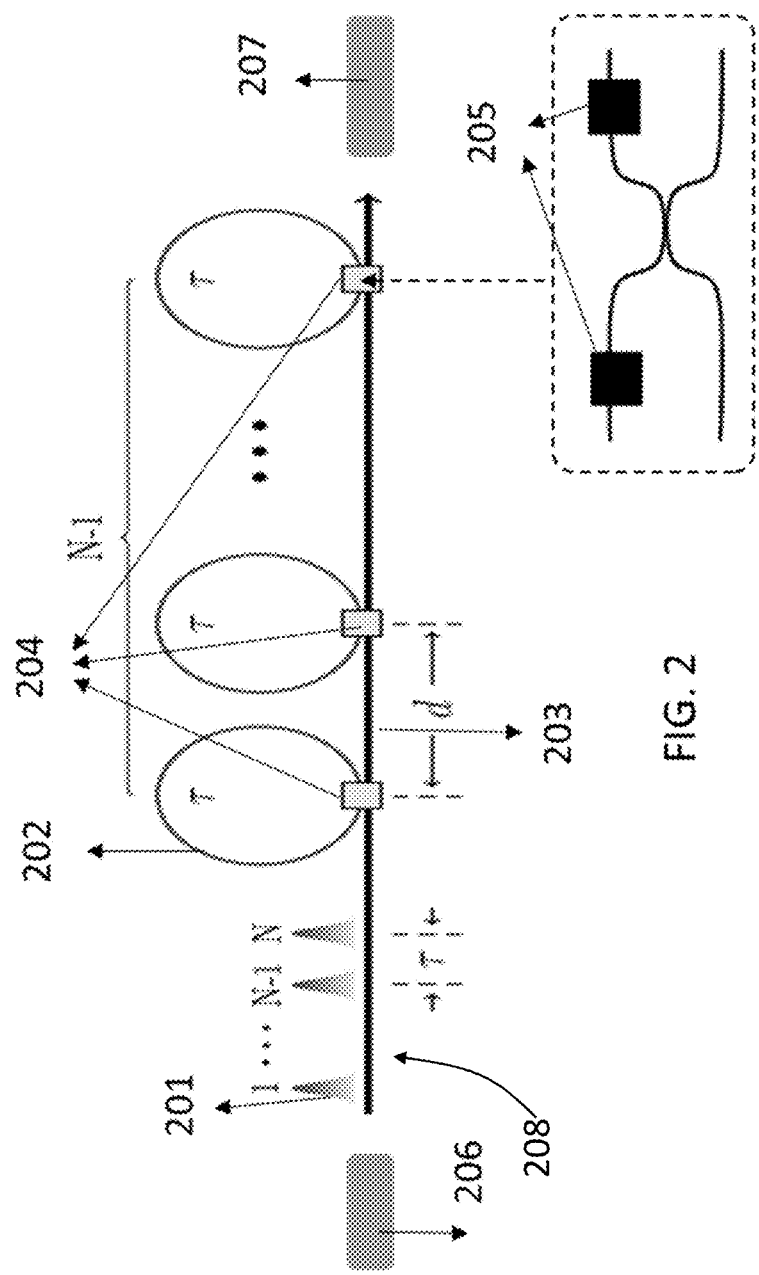
FIG. 2 is a schematic of the chain-loop system, according to an embodiment.

As shown in FIG. 2, a temporal mode encoding system 200 usually includes input time-bins 201 and output signals. The temporal mode encoding system 200 can be implemented using multiple integrated chips. The time-bins 201 are a sequence of optical pulses with a finite width in time. The interval between adjacent time-bins is usually chosen to be a fixed duration and determined by the length of the delay line and the repetition rate of the laser. The output signals have the same structure as the input time-bins, except that the states of the output signals have been changed according to the operation of the linear interferometer. The chain-loop system is a type of temporal mode encoding system. The system 200, implementing an N-mode universal interferometer, can include N−1 beam splitters 204 and N−1 optical delay lines 202, as shown in FIG. 2. The boxes 204 in FIG. 2 indicate fast tunable MZIs. N−1 optical delay lines 202 are used to implement an N-mode interferometer. In some embodiments, the optical delay lines 202 include waveguides to delay input optical signals. In some embodiments, the delay lines 202 are configured into a ring structure. In these embodiments, each waveguide has one end coupled to a first input port of the MZI 204 and the other end coupled to a first output port of the MZI 204. In addition, an input waveguide 208 (e.g., a linear waveguide) can form a second input and a second output port of the MZI 204. The input waveguide 208, although illustrated as a straight line in FIG. 2, can include multiple sections so as to form the multiple MZIs 204 in the system 200.

For input time-bins 201 separated by delay time τ, each optical delay line typically implements a delay time τ. No constraint on the delay d incurred by length of the beam path 203 that connects the loops, between two adjacent tunable beam splitters 204, occurs. The delay d can be chosen such that d is much smaller than the delay time τ. The number of optical components of the chain-loop system increases linearly with the size of the interferometer, whereas the number of optical components of a typical known spatially-encoded system usually increases quadratically. Therefore the control complexity of the chain-loop system of FIG. 2 is reduced with respect to the spatially-encoded systems.

For reconfigurability and control, beam splitters described herein (including those used in apparatus and systems shown in FIGS. 1A-4) are commonly implemented as Mach-Zehnder interferometers (MZIs) with two controllable phase shifters 205 (also referred to herein collectively as a network of optical devices). Phase shifters often operate independent from multi-port interferometers. A phase shifter often uses heat, electricity, or light to change the refractive index of the waveguide medium, cladding, or core.

The generation components at the input of the temporal mode encoding system and detection components at the output of the temporal mode encoding system could also influence the delay time τ. On the state generation side, generating input states can be separated in time by the repetition rate of the laser 206 driving their generation. Taking the repetition rate of a known telecommunications-band mode-locked laser to be in the GHz range, input state time-bins can be as near to each other as 1 ns. As for detection, while known photon-number-resolving detection systems 207 (e.g., single photon detectors) do not operate at these speeds, other detection schemes are possible including multiplexing of photon-number-resolving detectors. As such, temporal mode encoding systems 200 can be compared with a minimum delay time τ of 1 nanosecond. In some embodiments, the delay time τ can be about 1 ns to about 100 ns (e.g., about 1 ns, about 2 ns, about 5 ns, about 10 ns, about 20 ns, about 50 ns, or about 100 ns, including any values and sub ranges in between).

Figure 3:
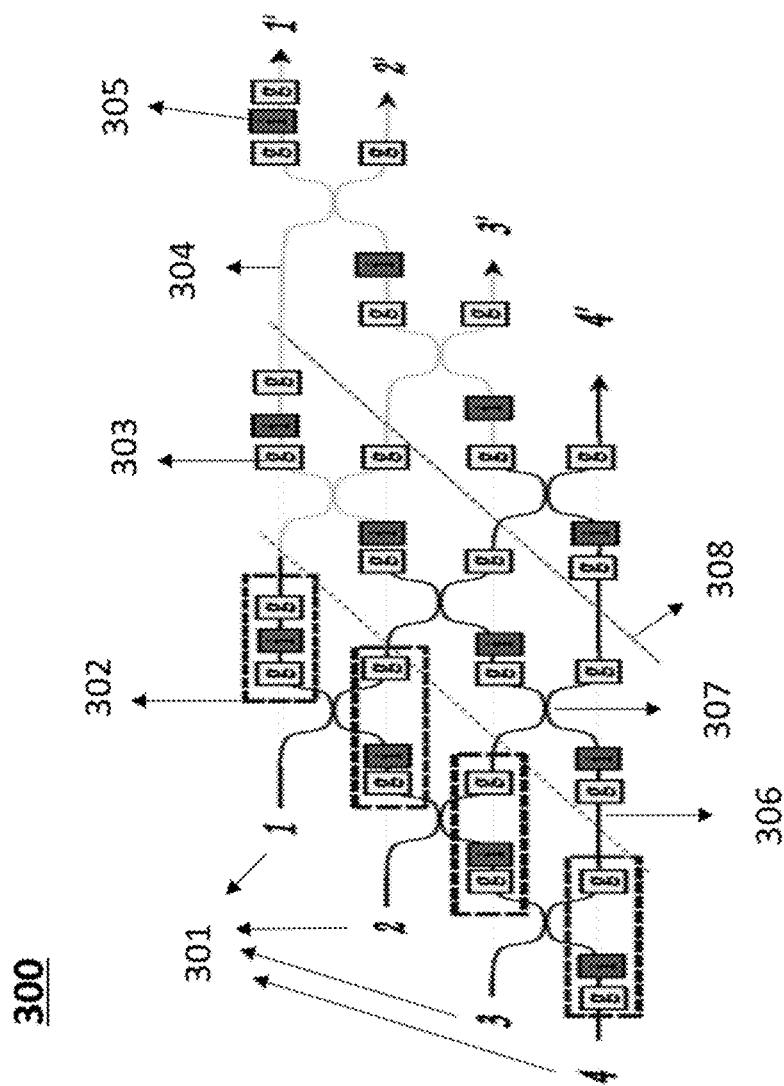
FIG. 3 shows implementation of a four-mode interferometer with chain-loop configuration, according to an embodiment

To detail how transmission factors accumulate, the following procedure is developed for inserting losses associated with the chain-loop temporal encoding directly on top of a sketch of a Reck scheme as shown in FIG. 3. FIG. 3 shows an implementation of a 4-mode interferometer 300 with chain-loop configuration. Each time all 4 time-bins 301 travel through a loop, one layer of the Reck scheme is applied. Different layers are separated by dashed lines 308. Optical components are connected using optical mediums 304, for example, optical fibers and/or on-chip photonic integrated circuit waveguides. Losses resulting from different optical components are indicated by different boxes. Boxes labeled with 'g' 303 indicate MZIs and boxes with 'i' indicate optical delay lines 305. The dashed lines around MZI and loop losses 302, represent the total loss incurred by optical components present on each arm of an MZI.

In some instances, the procedure to estimate optical losses in the chain loop system that implements a Reck scheme can be conducted as follows.

Sketch the corresponding Reck decomposition for unitary group of degree N, or U(N).

Add dashed diagonal lines to separate the N−1 layers.

Add j−1 MZIs to each layer j so that each layer contains N−1 MZIs.

Add a gate loss on the chip to each of the two output modes of each MZI (can be $2(N-1)^2$ modes in total)

Within each layer, add loop loss to the lower input mode and upper output mode of each MZI ($N^2$ in total)

Within each layer, add just two gate losses: one on the lower input mode to the lowest MZI, and one on the upper output mode or the uppermost MZI. These two extra losses are used to push the first time-bin into a loop, and to push the last time-bin out of a loop.

The effective transmission here is typically the same for each mode and can be independent of path taken from input to output. This can be written as:

$$\eta_{CL}=(\eta_g^2\eta_i)^{N-1}$$

The transmission losses incurred in the temporal mode encoding system are mainly incurred by MZIs and optical delay lines. Because no need often exists for fast switches in and out of long optical delay lines in the chain-loop system, the amount of coupling loss is typically reduced with respect to known temporally encoded dual-loop systems. Therefore, the proposed chain-loop system has the advantage of incurring lower loss and being more amenable to integration on a photonic chip than known dual loop temporal encoding devices.

The following description can be applied to both temporal and hybrid spatio-temporal encoding systems. Although the above has been mainly directed towards on-chip photonic integrated circuits, it should be understood that it is possible to build the encoding system in free space optics, fiber optics, or a combination of all three. In free space optics, for example, the delay could be implemented by the fast switches used for the reconfigurable beamsplitters or switches in and out of loops. These fast switches could be implemented in a fast acousto-optical or electro-optical material. Loops could be implemented in free space or be coupled into a fiber loop. Free-space optical implementation of the temporal encoding system often uses additional optical components such as lenses, which could introduce loss. Additionally, phase stability over the entire beam path would ultimately limit the number of modes that a free-space chain-loop system could act on. To get around issues of phase stability and control complexity, the entire chain-loop structure can be placed on a photonic chip. Propagation losses in on-chip photonic integrated circuits are larger than in free space or even fiber based optics, but components based on on-chip photonic integrated circuits typically have smaller footprints, longer beam paths, and faster modulators.

For an integrated platform implementation, the main source of loss is often propagation loss. This propagation loss is often proportional to the length of an optical path. Additional losses can include, for example, bending-loss or cross-talk. Such additional losses, however, can be ignored because, in principle, MZI-based devices can be made propagation-loss-limited. It can be difficult to define a single expression to quantify the overall loss of a photonic configuration, as light often travels along many different paths through the chip. A useful choice, however, is to use the loss suffered in light propagation across the entire chip. Using this definition of the effective loss, it is possible to write the overall transmission as $$\eta_{SE} = \exp(-\alpha_C L_{MZI})^N = \eta_g^N$$

where $\eta_{SE}$ is the overall transmission, $\alpha_C$ is the loss coefficient per unit length, and $L_{MZI}$ is the length of each MZI. An intuitive description of this relationship is to divide the chip into N layers of gates (each gate representing one MZI), giving $\eta_g = \exp(-\alpha_C L_{MZI})$ the physical meaning of transmission per layer. The $\eta_g^N$ represents $\eta_g$ to the exponent of N. More information about loss analysis can be found in Daiqin Sun, et al., Hybrid spatiotemporal architectures for universal linear optics, *Phys. Rev. A.*, Vol. 99, 062301, Jun. 3, 2019, which is incorporated herein in its entirety.

Figure 4:
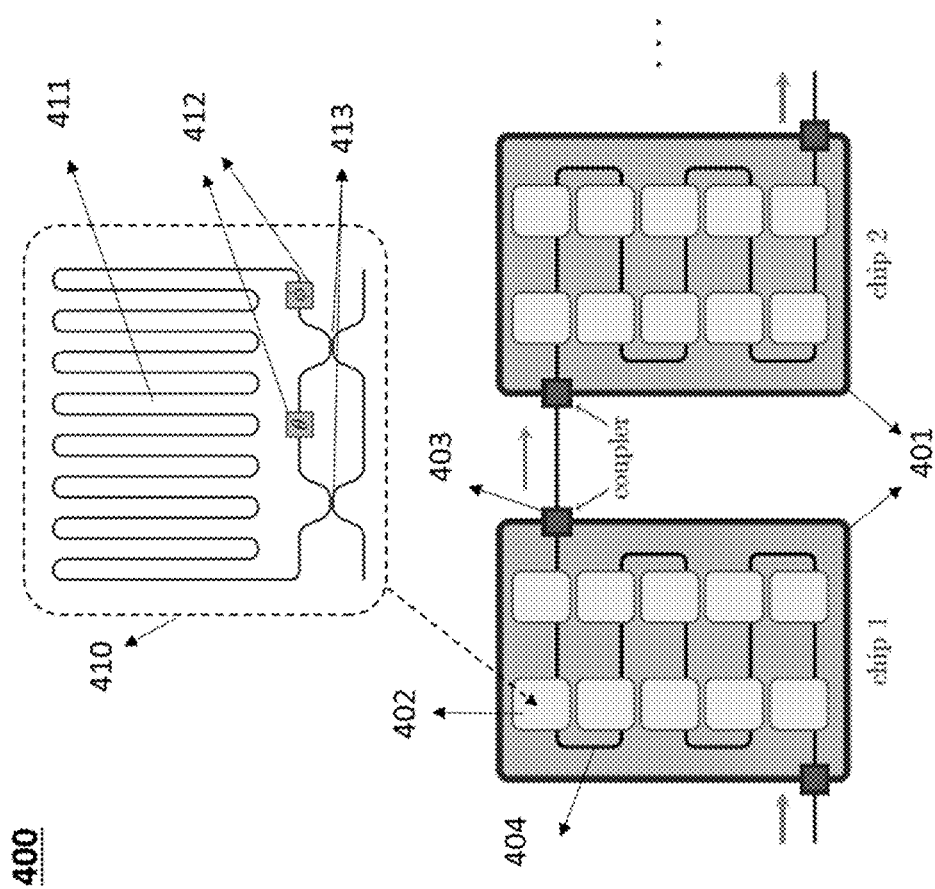
FIG. 4 is a schematic of a large chain-loop system using optical coupling between devices, according to an embodiment.

An embodiment of a hybrid mode encoding system 400 can include multiple photonic integrated circuit (PIC) chips 401, as shown in FIG. 4. In FIG. 4, multiple PIC chips 401 are connected together via optical coupling to form a larger PIC system for mode encoding. Each PIC chip includes multiple delay loop units 402 (also referred to herein as "optical units"). For illustrative purposes, an example of a delay loop unit 410 is shown in the top half of FIG. 4 with an expanded view of that delay loop unit 410. The delay loop unit 410 includes a single MZI, which has two 50:50 beam splitters 413, two phase shifters 412, and one optical delay line 411. The delay loop units 410 on PIC chips are connected in series via on-chip waveguides 404. Couplers 403 at the edge of a chip represent photonic chip coupling mechanisms that connect optical signals between PIC chips 401. The couplers between PIC chips can be, for example, refractive optical couplers or diffractive optical couplers. It is possible to couple information across integrated circuits, PIC chips made of different materials, and optical systems. Hence, a very large interferometer can be implemented by concatenating more PIC chips.

Figure 5A:
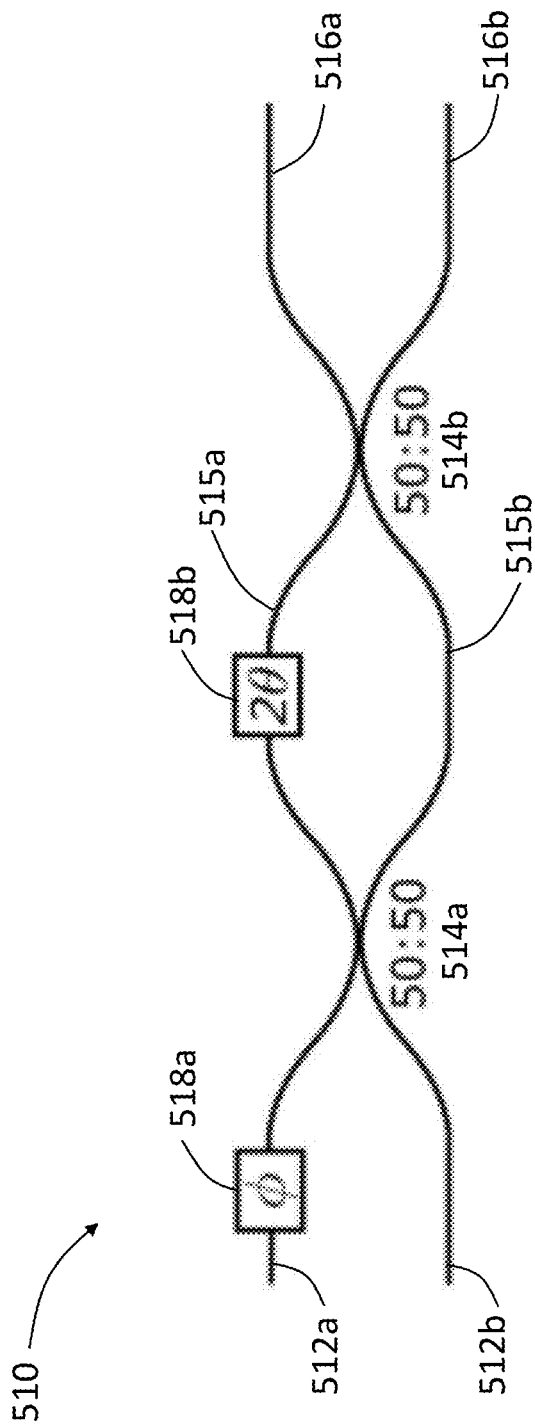
FIG. 5A is a schematic of a reconfigurable beamsplitter that can be used in an apparatus for implementing an arbitrary unitary transformation, according to an embodiment.

FIG. 5A is a schematic of a reconfigurable beamsplitter 510 that can be used in an apparatus (e.g., apparatus 100-120) for implementing an arbitrary unitary transformation, according to an embodiment. The beamsplitter 510 includes two input ports 512a and 512b and two output ports 516a and 516b. The input ports 512a/b and the output ports 516a/b are coupled by two 50:50 beamsplitters 514a and 514b connected by two interference arms 515a and 515b. A first phase shifter 518a is operatively coupled to the first input port 512a to implement a phase shift denoted as $\phi$, and a second phase shifter 518b is operatively coupled to the first interference arm 515a to implement a phase shift denoted as $2\theta$. By adjusting the amount of phase shifts applied by the first phase shifter 318a and the second phase shifter 518b (e.g., via the electro-optical effect or the thermo-electric effect), the reconfigurable beamsplitter 510 can achieve any given transmission ratio between the output optical modes and the input optical modes. For example, the reconfigurable beamsplitter 510 can be configured into the reflective state by setting $\theta=0$, $\phi=\pi/4$ and can be configured into the transmissive state by setting $\theta=0$, $\phi=0$.

With the above notation, the reconfigurable beamsplitter 510 can implement a transformation characterized by matrices $T_{mn}$. Therefore, the reconfigurable beamsplitter 510 can be regarded as a U(2) (i.e., M=2) universal interferometer and can be used as the universal interferometer (e.g., 101, 102, 111, and 121) in the apparatus 100-120 shown in FIGS. 1A-1C.

Figure 5B:
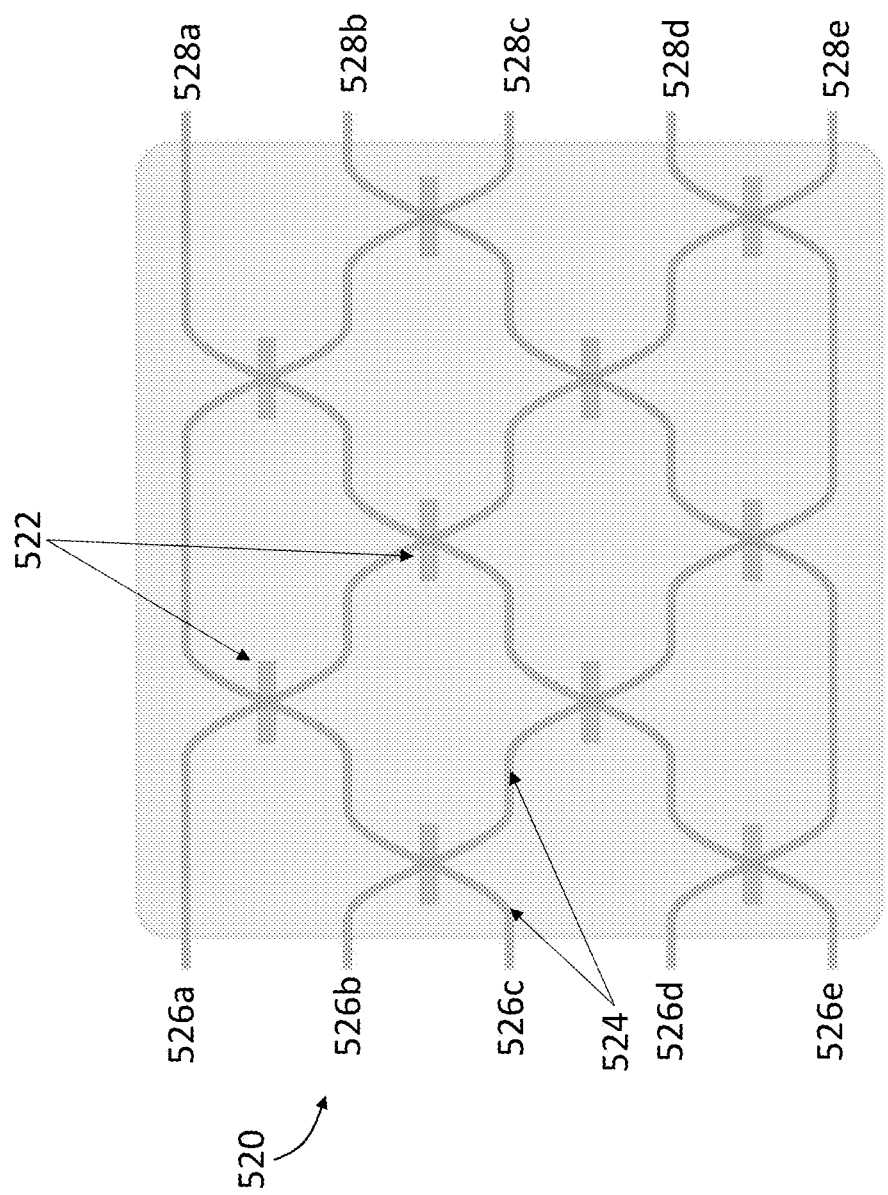
FIG. 5B shows a schematic of a universal interferometer that can be used in an apparatus for implementing an arbitrary unitary transformation, according to an embodiment.

FIG. 5B shows a schematic of a universal interferometer 520 that can be used in an apparatus (e.g., apparatus 100-120) for implementing an arbitrary unitary transformation, according to an embodiment. The universal interferometer 520 includes a network of reconfigurable beamsplitters 522 (only two reconfigurable beamsplitters are labelled for illustrative purposes) interconnected by waveguides 524 (only two waveguides are labelled for illustrative purposes). Each reconfigurable beamsplitter in the network of reconfigurable beamsplitters 522 can be substantially identical to the reconfigurable beamsplitter 510 shown in FIG. 5A. The universal interferometer 520 also includes five input ports 526a to 526e and five output ports 528a to 528e. Therefore, the universal interferometer 520 is a U(5) universal interferometer (i.e., M=5). Any other appropriate number M can also be used to construct a general U(M) universal interferometer.

Figure 5C:
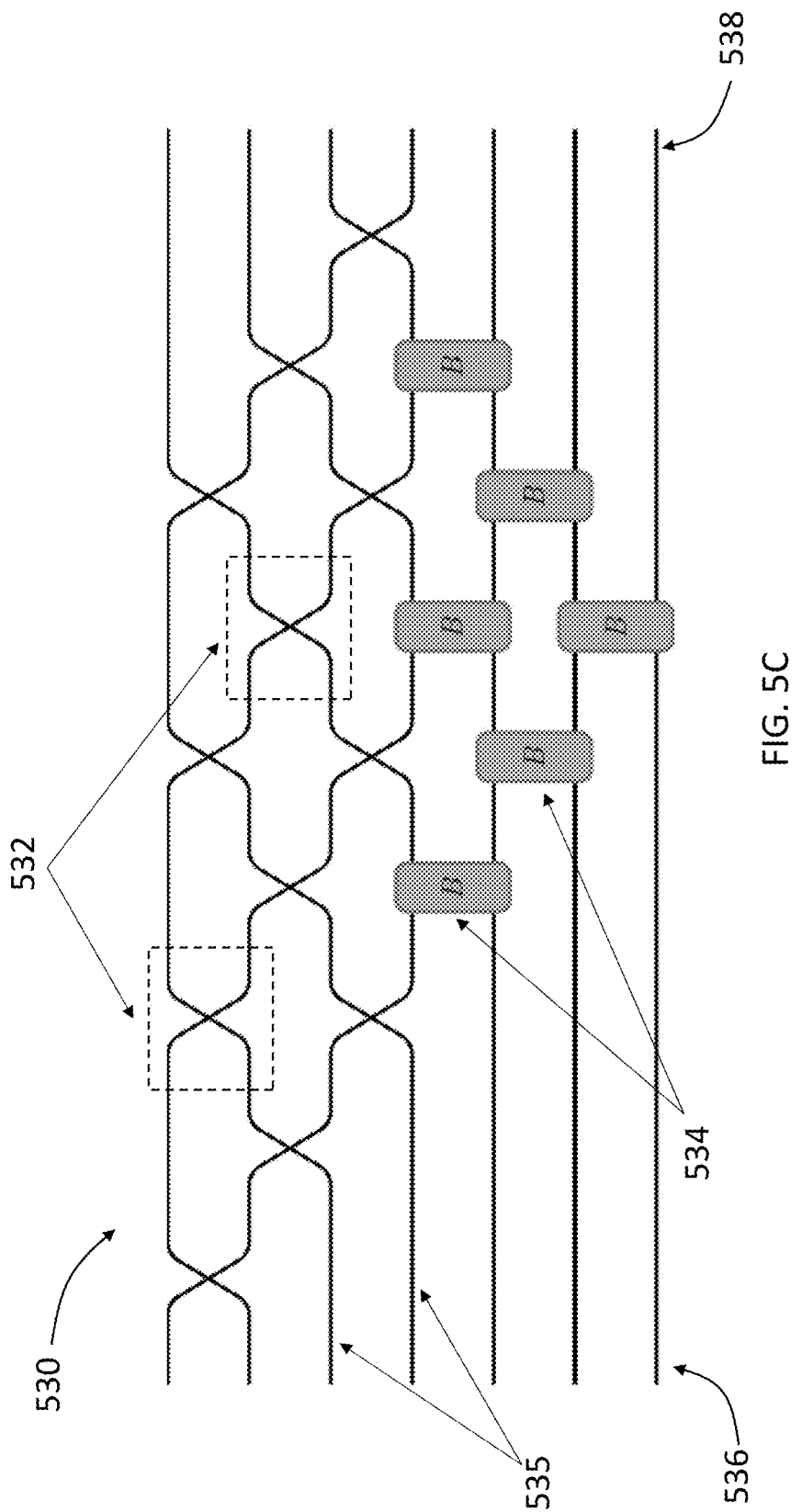
FIG. 5C shows a schematic of a residual interferometer that can be used in an apparatus for implementing residual transformations, according to an embodiment.

FIG. 5C shows a schematic of a residual interferometer 530 that can be used in an apparatus (e.g., apparatus 100-120) for implementing residual transformations, according to an embodiment. The residual interferometer 530 includes a network of swap gates 532 (only two swap gates are labelled for illustrative purposes) interconnected by waveguides 535 (only two waveguides are labelled for illustrative purposes) and a network of reconfigurable beamsplitters 534 (only two reconfigurable beamsplitters are labelled for illustrative purposes) interconnected by waveguides 535. In some embodiments, each swap gate in the network of swap gates 532 can be substantially similar to the reconfigurable beamsplitter 510 shown in FIG. 5A and configured in the transmissive state (e.g., $\theta=0$, $\phi=0$). In some embodiments, each reconfigurable beamsplitter in the network of reconfigurable beamsplitters 534 can be substantially identical to the reconfigurable beamsplitter 510 shown in FIG. 5A.

The residual interferometer 530 illustrated in FIG. 5C also includes seven input ports 536 and seven output ports 538, so the residual interferometer 530 is a U(7) residual interferometer (i.e., M=5 because 2M−3=7 under notations used in this description). This residual interferometer 530 can be used in combination with the universal interferometer 520 shown in FIG. 5B to form an optical circuit to implement elimination-based decompositions that factorize a given matrix into U(5) universal matrices and U(7) residual matrices.

In some embodiments, the residual interferometer 530 can include any other appropriate number of input ports and output ports, denoted as 2M−3. In these embodiments, the number of swap gates 532 in the residual interferometer 530 can be about (M−1)(M−2) and the number of reconfigurable beamsplitters 534 can be about (M−1)(M−2)/2. In some embodiments, M can be anywhere between 3 and 100 (e.g., about 3, about 5, about 10, about 20, about 30, about 50, or about 100, including any values and sub ranges in between).

In some implementations, the universal interferometer 520 includes M input ports and the residual interferometer 530 includes (2M−3) input ports. In the universal interferometer 520, a first delay line couples one output port with one input port. The (M−1) output ports in the output ports are coupled to (M−1) input ports of the residual interferometer 530. Accordingly, the residual interferometer 530 has (M−2) input ports out of the (2M−3) input ports and these input ports are not coupled to the output ports of the universal interferometer 520. Instead, these (M−2) input ports are coupled to (M−2) output ports of the residual interferometer 530.

Various concepts may be embodied as one or more methods, of which at least one example has been provided.

The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed is:

1. An apparatus, comprising:
   a plurality of interconnected reconfigurable beam splitters and a plurality of phase shifters collectively configured to define a network of optical devices, the network of optical devices configured to perform a universal transformation on a plurality of input optical signals; and
   a first delay line optically coupled to the network of optical devices and configured to send at least one output optical signal from a plurality of output optical signals of the network of optical devices to interact with at least one input optical signal in the plurality of input optical signals within the network of optical devices.

2. The apparatus of claim 1, wherein the plurality of output optical signals are spatially encoded linear optical transformations of the plurality of input optical signals.

3. The apparatus of claim 1, wherein the plurality of output optical signals are spatially and temporally encoded linear optical transformations of the plurality of input optical signals.

4. The apparatus of claim 1, wherein the network of optical devices includes:
   a universal interferometer including a network of interconnected reconfigurable beamsplitters; and
   a residual interferometer optically coupled to the universal interferometer and including a network of interconnected reconfigurable beamsplitters and swap gates.

5. The apparatus of claim 1, wherein the network of optical devices includes:
   a universal interferometer including a network of interconnected reconfigurable beamsplitters and M input ports to receive M input optical signals from the plurality of optical signals; and
   a residual interferometer optically coupled to the universal interferometer and including (M−1)(M−2)/2 beamsplitters and (M−1)(M−2) swap gates.

6. The apparatus of claim 1, wherein the plurality of input optical signals includes N input optical signals, N is a positive integer, and the network of optical devices includes:
   a universal interferometer including a network of interconnected reconfigurable beamsplitters and configured to perform an arbitrary unitary transformation on M input optical signals from the N input optical signals, M being a positive integer less than N; and
   a residual interferometer optically coupled to the universal interferometer and configured to perform a residual transformation on (2M−3) input optical signals from the N input optical signals.

7. The apparatus of claim 1, wherein the plurality of input optical signals includes N input optical signals, N is a positive integer, and the network of optical devices includes:
   a universal interferometer including a network of interconnected reconfigurable beamsplitters and a second delay line configured to optically couple one output of the universal interferometer with one input of the universal interferometer, the universal interferometer configured to perform an arbitrary unitary transformation on M input optical signals from the N input optical signals, M being a positive integer less than N; and a residual interferometer optically coupled to the universal interferometer and configured to perform a residual transformation on (2M−3) input optical signals from the N input optical signals, the residual interferometer including (M−2) delays lines configured to couple (M−2) outputs of the residual interferometer with (M−2) inputs of the residual interferometer, the (M−2) delay lines including the first delay line.

8. The apparatus of claim 1, wherein the network of optical devices includes:
a universal interferometer including a network of interconnected reconfigurable beamsplitters; and
a cosine-sine (CS) interferometer optically coupled to the universal interferometer and configured to perform a CS transformation on at least some input optical signals from the plurality of input optical signals.

9. The apparatus of claim 1, wherein the network of optical devices includes:
a universal interferometer including a network of interconnected reconfigurable beamsplitters and M output ports;
a CS interferometer optically coupled to the universal interferometer and including 2M input ports;
M switches optically coupled to the M output ports of the universal interferometer and the 2M input ports of the CS interferometer, a first M input ports from the 2M input ports of the CS interferometer configured to receive optical signals from the M output ports of the universal interferometer when the M switches are configured in a transmissive state, and a second M input ports from the 2M input ports of the CS interferometer configured to receive optical signals from the M output ports of the universal interferometer when the M switches are configured in a reflective state.

10. The apparatus of claim 1, wherein the network of optical devices includes:
a first universal interferometer including a first network of interconnected reconfigurable beamsplitters and first M output ports;
a second universal interferometer including a second network of interconnected reconfigurable beamsplitters and second M output ports; and
a CS interferometer optically coupled to the first universal interferometer and the second universal interferometer, the CS interferometer including M reconfigurable beamsplitters, each reconfigurable beamsplitter in the M reconfigurable beamsplitters configured to receive a first input from one output port in the first M output ports and a second input from one output port in the second M output ports.

11. The apparatus of claim 1, wherein the plurality of input optical signals includes N input optical signals, N being a positive integer, and the network of optical devices includes a plurality of M-mode universal interferometers, M being a positive integer less than N, M being about 3 to about 100, and N being about 10 to about 10000.

12. The apparatus of claim 1, wherein the network of optical devices is configured to perform the universal transformation on the plurality of input optical signals via a triangular architecture.

13. The apparatus of claim 1, wherein the network of optical devices is configured to perform the universal transformation on the plurality of input optical signals based on elimination-based decomposition of the universal transformation via a triangular architecture.

14. The apparatus of claim 1, wherein the network of optical devices is configured to perform the universal transformation on the plurality of input optical signals based on CS decomposition of the universal transformation via a triangular architecture.

15. An apparatus, comprising:
a plurality of optical units optically connected in series, each optical unit from the plurality of optical units having a reconfigurable Mach-Zehnder interferometer (MZI) that includes at least one phase shifter optically coupled to the at least one reconfigurable MZI,
each optical unit from the plurality of optical units configured to receive an input optical signal and configured to send an output optical signal that is temporally delayed relative to the input optical signal for that optical unit and that is recirculated with the input optical signal for that optical unit.

16. The apparatus of claim 15, wherein:
each optical unit from the plurality of optical units is configured to receive a plurality of input optical signals, adjacent input optical signals in the plurality of input optical signals being separated by a time delay τ, and
each optical unit from the plurality of optical units is configured to temporally delay each input optical signal by the time delay τ.

17. The apparatus of claim 15, wherein each optical unit from the plurality of optical units is configured to temporally delay the input optical signal by about 1 ns to about 100 ns.

18. The apparatus of claim 15, wherein each optical unit further includes a waveguide configured to temporally delay the input optical signal, the waveguide including a first end optically coupled to a first input of the reconfigurable MZI and a second end coupled to a first output of the reconfigurable MZI.

* * * * *